United States Patent [19]

Sakurai et al.

[11] Patent Number: 4,913,258

[45] Date of Patent: Apr. 3, 1990

[54] ELECTRIC VEHICLE

[75] Inventors: Hiroshi Sakurai, Yokohama; Masao Ono, Meguro; Atsushi Mamiya, Kawasaki, all of Japan

[73] Assignees: Nippon Steel Corporation; Tokyo R and D Co., Ltd., both of Tokyo, Japan

[21] Appl. No.: 262,026

[22] Filed: Oct. 25, 1988

[30] Foreign Application Priority Data

Mar. 29, 1988 [JP] Japan ................................. 63-73181

[51] Int. Cl.$^4$ .............................................. B60K 7/00
[52] U.S. Cl. .................................. 180/242; 180/65.5; 310/60 R; 310/63
[58] Field of Search .................... 180/242, 65.5, 65.6; 310/67 R, 67 A, 60 R, 63

[56] References Cited

U.S. PATENT DOCUMENTS

| | | | |
|---|---|---|---|
| 2,506,146 | 4/1947 | Gladish | 310/67 R |
| 3,937,293 | 2/1976 | Susdorf | 180/65.6 |
| 4,021,690 | 5/1977 | Burton | 310/67 R |
| 4,760,891 | 8/1988 | Moss | 180/65.5 |

FOREIGN PATENT DOCUMENTS

| | | |
|---|---|---|
| 183097 | 6/1936 | Czechoslovakia . |
| 1478059 | 4/1966 | France . |
| 2169611 | 8/1973 | France . |
| 2561593 | 3/1984 | France . |
| 47-18010 | 10/1972 | Japan . |
| 48-38506 | 5/1973 | Japan . |
| 52-22214 | 2/1977 | Japan . |
| 54-21312 | 2/1979 | Japan . |
| 62-295772 | 6/1986 | Japan . |

*Primary Examiner*—Kenneth R. Rice
*Attorney, Agent, or Firm*—Wenderoth, Lind & Ponack

[57] ABSTRACT

An electric vehicle which has motor wheels of the direct-drive outer-rotor type which permit simplification and compaction of the motor wheels. Current regulating covers introduce ambient air for cooling the motors and reduce air resistance, and batteries and control devices are disposed symmetrically relative to the axial line of the vehicle body and to axial lines of the axles so as to reduce and uniformly distribute the weight of the vehicle. All these devices contribute jointly to increasing the range of the electric vehicle.

5 Claims, 10 Drawing Sheets

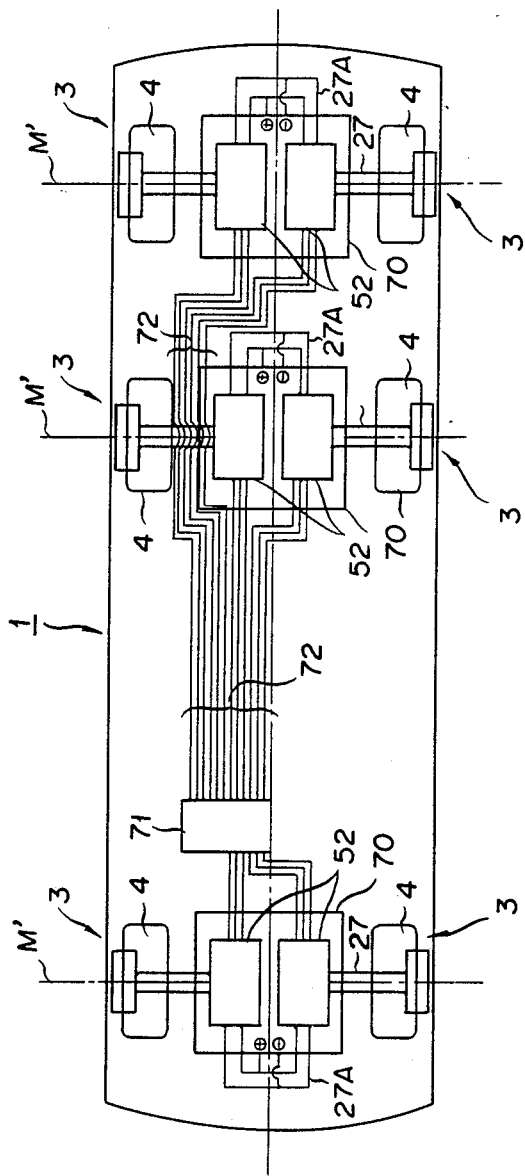

ELECTRIC VEHICLE

BACKGROUND OF THE INVENTION

1. Field of the Invention

This invention relates to an electric vehicle which is provided with direct-drive and outer-rotor type motor wheels adapted to be directly rotated by a motor and symmetrically disposed longitudinally and laterally.

2. Description of the Prior Art

In recent years, the electric vehicle using battery electricity as a power source and a motor as a drive source has been attracting attention because of such merits as low air pollution, low noise, and easy control, etc.

The conventional electric vehicle is of the double driven axles type which mount mutually independent the wheels and the motors. For the purpose of ensuring smooth and accurate performance of such operations as transmitting the rotation of the motor to the wheels and altering the rotation numbers of the laterally opposite wheels thereby enabling the vehicle to turn a corner, the vehicle of this type inevitably requires use of power transmission devices such as a reduction gear and a differential gear (Japanese Utility Model Application Disclosure SHO No. 47(1972)-18,010) and accessorial devices such as a drive shaft, etc. for interlocking the power transmission devices with the wheels (Japanese Utility Model Application Disclosure SHO No. 48(1973)-38,506).

These power transmission devices and accessorial devices, however, entail not only an addition to the weight of the vehicle body but also a sacrifice of the efficiency of power transmission and consequently have the possibility of increasing the vehicle's energy consumption and decreasing the vehicle's travelling distance between chargings of its batteries (referred to as "range"). As is widely known particularly in the case of the electric vehicle, the fact that the range is short constitutes one major cause for preventing the electric vehicle from finding widespread acceptance.

Recently, a vehicle using the direct-drive type motor wheels for the purpose of eliminating the aforementioned power transmission devices such as a reduction gear, a differential gear, and a drive shaft, etc. thereby improving the efficiency of powwer transmission and decreasing the weight of the vehicle body has been introduced. These direct-drive type motor wheels, which directly transmit the motor torque to the wheels, fall under two types; those having the wheels mechanically interlocked with the motor (Japanese Utility Model Application Disclosure SHO No. 54(1979)-21,312 and U.S. Pat. No. 3,937,293, for example) and those having motors incorporated in the wheels (Japanese Patent Application Disclosure SHO No. 52(1977)-22,214 and U.S. Pat. No. 4,021,690, for example).

The motor wheels of the former type having the wheels interlocked with the motor have the possibility of increasing the weight of the vehicle body and decreasing the range because they inevitably enlarge the size of the motor wheel in the axial direction and require thick solid rotary shafts of motors to be provided as axles. The whole structure of the motor wheels gains in complexity because it inevitably incorporates therein mechanisms for supporting the rotary shafts and power cables for supply of electricity to the motors. The motors are cooled only with difficulty. Problems also arise as to the operational efficiency with which the motor wheels are assembled and the ease with which the motor wheels are given required maintenance and inspection.

The motor wheels of the latter type having motors attached to the wheel discs pose problems similar to those of the former type because of inevitable use of thick solid rotary motor shafts as axles and consequent complication of the whole construction of the motor wheels. They raise an additional problem that since the motors are disposed inside the wheels, the work of cooling be performed on the motors is liable to expose the motor interiors to dusty ambient air and degrade the durability of the motor wheels due to the contamination by dust.

The double driven axles type electric vehicle mentioned above has motors disposed inside the axles and has shafts of the motors interlocked with the axles by a chain or gears. The batteries as a power source for the motors are mounted on the front and rear parts of the chassis of the vehicle.

The control device for controlling the rotation of the motors is disposed in the front central part of the chassis of the vehicle. This control device is adapted to receive a signal issued from a steering wheel, an accelerator pedal, or a brake pedal at the operator's discretion and, based on this signal, control the travelling condition of th electric vehicle.

In all the signals, the signal issued from the accelerator pedal serves as the reference signal for the control device to compute the torque of the motor. The control device controls the electric current flowing from the batteries to the motors in such a manner that the motors will be caused to rotate with the torque computed in accordance with the reference signal. The motive power generated by the electric current controlled as described above is transmitted via the reduction gear to the wheels and spent there in driving the electric vehicle.

In the electric vehicle of this kind, the batteries are disposed separately in the front and rear parts of the electric vehicle in due consideration of balanced weight distribution. The control device, however, is disposed approximately in the central part of the electric vehicle. The central position selected for the location of the control device is a necessary consequence of the consideration paid to effective use of space and to the ease with which the operator manipulates the control device for impartation of a necessary operating signal.

In the electric vehicle, since the motors as a drive source are attached to the rear wheels, the power lines (the lines for connecting the batteries to the control device and the control device to the motors) inevitably have long distances of distribution. Further, since the power lines are thick copper wires, the total weight of the power lines is naturally heavy.

The conventional electric vehicle, therefore, entails an increase in the weight of the vehicle body and a decrease in the range. The power lines suffer from drop of voltage and loss of electricity in transit. Owing to the drop of voltage and the heavy weight of power lines, the electric vehicle is inevitably compelled to experience a decline in the capacity for acceleration.

The inventor's diligent study directed to elimination of the drawbacks inherent in the conventional electric vehicle as described above, specifically to development of a motor light and compact, capable of manifesting a large output, and optimal for an electric vehicle, has culminated in the development of an electric vehicle which enhances the merits of the direct-drive system, i.e. simplification of the power transmission mechanism and reduction in weight of the entire vehicle body and, at the same time, permits perfect solution of the demerits of the system, i.e. undesirable enlargement of the motor wheels in the axial direction and difficulty involved in the assembly of the entire vehicle body.

The first object of this invention is to provide an electric vehicle which is furnished with direct-drive and outer-rotor type motor wheels contributing to the simplification of the power transmission mechanism and the reduction in weight of the entire vehicle body and fulfilling the dimensional reduction of motor wheels in the axial direction and the facilitation of the work of assembly of the entire vehicle body.

The second object of this invention is to provide an electric vehicle which enables the motors for the motor wheels to be effectively cooled with ease.

The third object of this invention is to provide an electric vehicle which has batteries for supply of electricity to the motor wheels and a control device for control of the motor wheels disposed at positions fit for shortening the total distance of distribution of power lines and decreasing the weight of the vehicle body.

SUMMARY OF THE INVENTION

The first object of this invention is attained by an electric vehicle provided with outer-rotor type motor wheels, where the electric vehicle is characterized by having in each of the motor wheels a wheel disc rotatably fitted around a hub coaxially interlocked with a knuckle, a wheel attached to the periphery of the wheel disc, a rotor of a motor fastened to the outer side of the wheel disc by being fixed with bolts from outside, and a stator opposed to the rotor across a narrow gap and fastened to the hub by being fixed with bolts from outside the wheel.

This construction, owing to the adaption of the direct-drive system and the use of a hollow knuckle and a hollow hub respectively as an axle and a rotary shaft of a motor, obviates the necessity of using such power transmission devices as a reduction gear, a differential gear, and a drive shaft, simplifies the construction of the axle, and fulfills the desired reduction in weight and volume of the vehicle body. As the result, the range is increased. As concerns the assembly of motor wheels on the electric vehicle, since the rotor can be fastened to the wheel disc and the stator to the hub from outside the wheel by being fixed with bolts, the operator is able to perform necessary maintenance and inspection easily on the vehicle from outside without taking the trouble of crawling under the chassis. Since the component parts can be adapted so as to be assembled by being sequentially superposed one on top of another, the work of assembly itself is very easy.

The second object of this invention is attained by an electric vehicle having the outer-rotor type motor wheels, each of which is provided with a motor cooling device which comprises communicating paths formed of hollow interiors of the knuckle and hub, with the outer openings of the communicating paths protruding from the wheel, and an air current regulating cover attached to the outer end opening and furnished with an air inlet serving the purpose of introducing the ambient air into the communicating paths.

In this construction, since the communicating paths formed inside the knuckle and hub are utilized for passage of the cooling air to be used for removal of heat from the motor, the heat emitted from the cables and from the motor is quickly removed by the air flowing through the communicating paths. Since the cooling air can be smoothly introduced through the air inlet into the communicating paths, the motor cooling device enjoys an enhanced operational efficiency. When the air current regulating cover is elongated in the direction of travel so as to cover the outside of the motor wheel, the aerodynamic drag of the motor wheel can be decreased.

The third object of this invention is attained by an electric vehicle having batteries for supply of electricity and a control device for controlling the motor wheel disposed in the proximity of each of the motor wheels and having the batteries and the control device connected to the motor wheels with power lines.

In this construction, a useful space is secured in the central part of the electric vehicle. Since the motor wheels and their control devices can be closely juxtaposed to each other, the total distance required for the distribution of power lines interconnecting the motor wheels, the batteries, and the control devices can be reduced and the total weight of the necessary power lines can be decreased. As the result, the decline of the capacity for acceleration and the decrease of the range due to the loss of power during distribution and the heavy weight of power lines can be curbed and the overall efficiency of the electric vehicle can be improved.

BRIEF DESCRIPTION OF THE DRAWINGS

FIG. 11 is a cross section illustrating still another embodiment of this invention.

DETAILED DESCRIPTION OF THE PREFERRED EMBODIMENT

Now, the electric motor of the present invention will be described in detail below with reference to the accompanying drawings.

Figure 1:
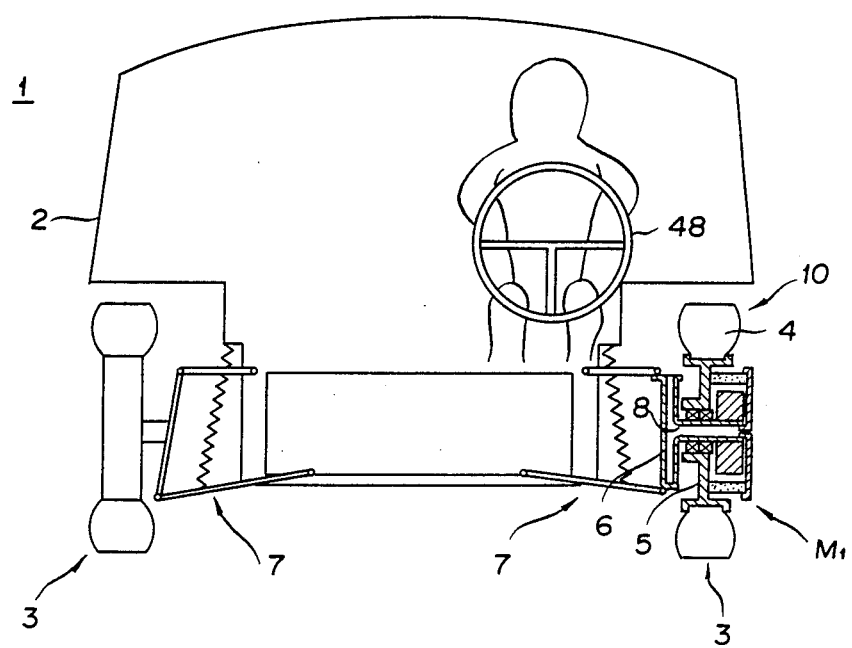
FIG. 1 is a cross-section of in one embodiment of the present invention.

In FIG. 1, the part of motor wheel on the righthand side is illustrated schematically and the part of motor wheel on the lefthand side illustrated skeletally.

An electric vehicle 1 has a simple so-called four-wheel steering (4WS) type construction in which the steering angle of the rear wheels is controlled in response to the travelling torque and the steering angle of the front wheels serving as steering wheels. Four motor wheels 3, 3, . . . symmetrically disposed longitudinally and laterally on a vehicle body 2 have a roughly similar construction.

The motor wheels 3 are of the outer-rotor type having a wheel 10 (to be described fully later on) fitted to the periphery of a wheel disc 5 and a motor $M_1$ fastened to the outer side of the wheel disc 5. This motor $M_1$ rotates the wheel disc 5, a mechanism which imparts the function of direct-drive to the electric vehicle.

The motor wheels 3 are each provided at the center thereof with a knuckle 6 and attached through the medium of a suspension 7 to the vehicle body 2 in such a manner as to be reciprocated vertically and able to adjust the steering angle.

Figure 2:
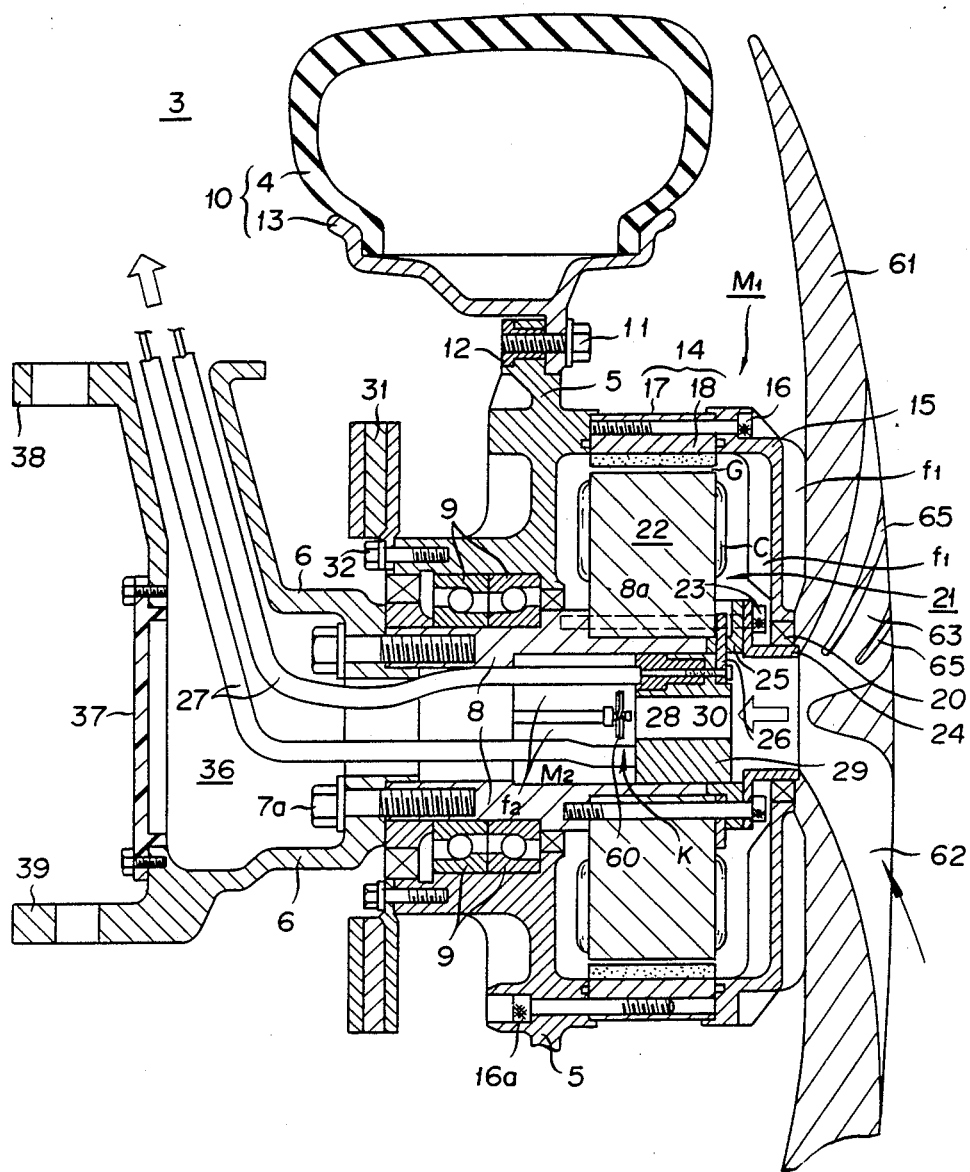
FIG. 2 is a cross-section of a portion of a motor wheel in the embodiment.

The knuckle 6 has a hollow structure as illustrated in FIG. 2 and is coaxially connected to a hub 8 with bolts 7a. To the periphery of this hub 8, the wheel disc 5 is rotatably attached through the medium of a bearing 9. The hub 8 concurrently serves as the rotary shaft of the motor $M_1$ and an axle.

The wheel 10 attached to the periphery of the wheel disc 5 comprises a rim 13 fastened with hub bolts 11 and hub nuts 12 and a tire 4.

To the outer peripheral part of the wheel disc 5, a rotor 14 of the motor $M_1$ and a cover 15 covering the outer side of the motor $M_1$ are jointly fastened from outside with a plurality of bolts 16. The rotor 14 is further attached to the wheel disc 5 with bolts 16a tightened outwardly from inside as illustrated in the lower part of FIG. 2.

In this arrangement, since the cover 15 can be attached and detached from the outer side, the ease with which the component parts are assembled and given necessary maintenance and inspection can be improved. Since this cover is fixed up both inwardly and outwardly with the bolts 16 and 16a, it is secured strongly and will not to come loose.

The rotor 14 comprises an annular yoke 17 and a permanent magnet 18 of rare earth metal which has a small wall thickness, is capable of generating a powerful magnetic field and is fastened with adhesive or bolts to the inner wall surface of the yoke 17.

The permanent magnet 18 of rare earth metal not only possesses a large magnetic flux density but manifests a high crystal magnetic anisotropy at room temperature, and therefore, manifests a large coercive force. For use with the motor, this permanent magnet can be formed compactly with a small wall thickness and capable of producing a large output.

As compared with the ordinary permanent magnet of the alnico type or a ferrite type which possesses a coercive force approximately in the range of 50 to 270 kA/m, the permanent magnet of a rare earth cobalt type (RCo5), for example, possesses a coercive force in the range of 680 to 800 kA/m. This comparison clearly evinces the effectiveness of the permanent magnet of rare earth metal mentioned above.

The cover 15 is made of a light metal such as aluminum alloy and, for the purpose of improving the release of heat from the motor $M_1$, is provided on the inner surface and the outer surface with external heat-radiating fins $f_1, f_1$. The central bore part of the cover is sealed with a dust seal member 24 (described later) and a mechanical seal 20.

A stator 21 opposed to the rotor 14 across a narrow gap G has the inner peripheral part of an armature core 22 encircled with a coil C fastened to a flange 8a of the hub 8 with bolts 23. Owing to this fastening, the dust seal member 24 and a torque ring 25 are jointly fastened also.

Figure 3:
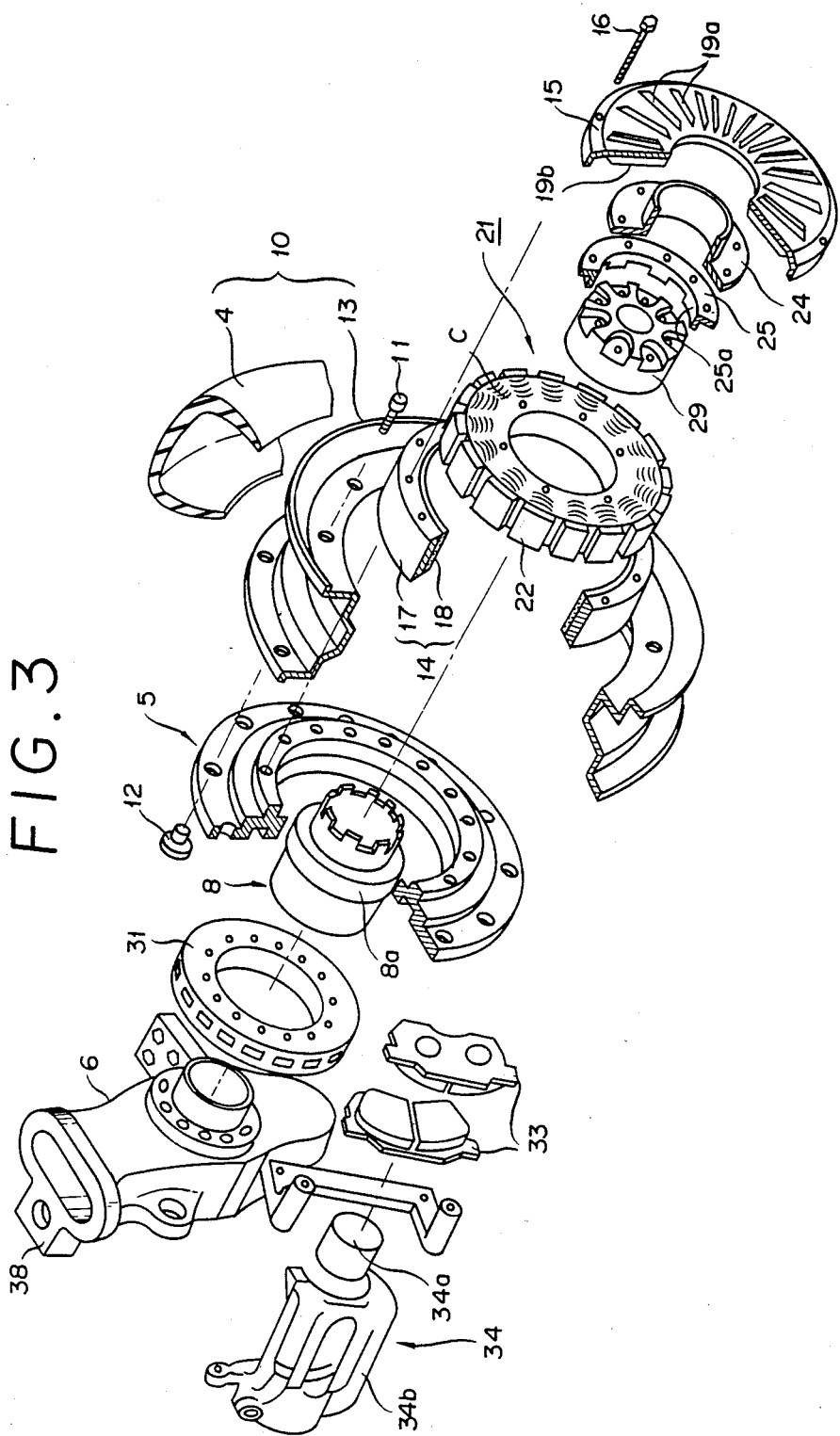
FIG. 3 is an exploded perspective view of the motor wheel.

As is evident from FIG. 3, this torque ring 25 has a cross-section in the shape of an L. An annular projection 25a has teeth sparcely raised. The teeth formed on the edge of the hub 8 mesh with the teeth on the annular projection 25a.

Figure 4:
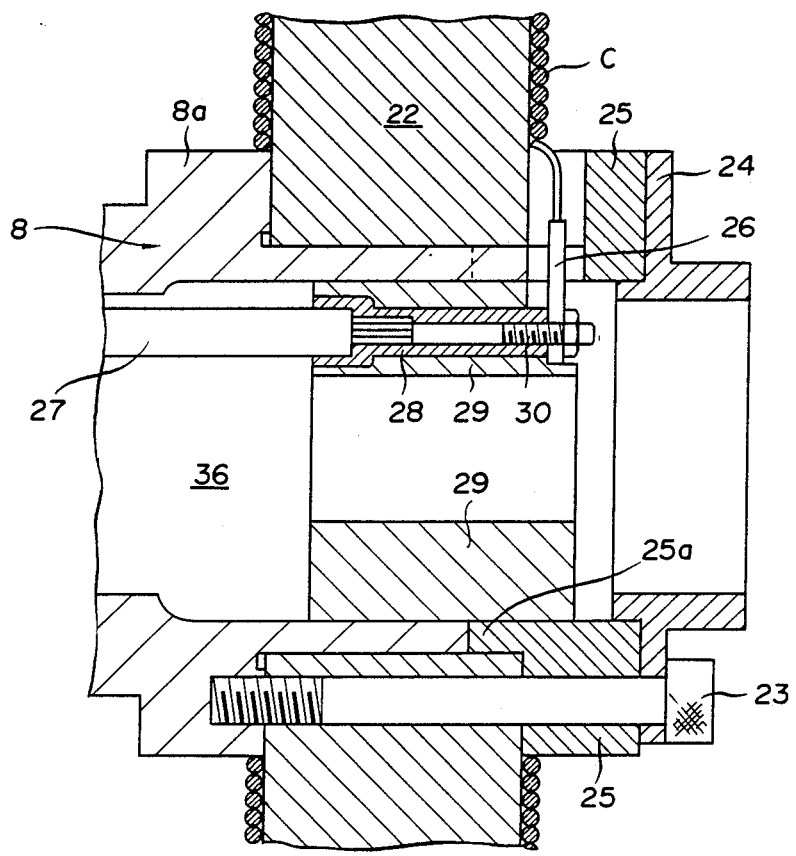
FIG. 4 is a magnified cross-section of a portion of FIG. 2.

The coil C and a power line 27 inserted through the interior of the hub 8 are interconnected through the medium of a platelike terminal 26. This interconnection is accomplished by fastening a tubular connector by staking to the terminal of the power line 27, inserting the connector 28 through a cable holder 29, and attaching a stud bolt 30 to the terminal of this connector 28 through the medium of the terminal 26 as illustrated in detail in FIG. 4.

To the inner terminal surface of the wheel disc 5, a brake disc 31 is attached with bolts 32 as illustrated in FIG. 2. This brake disc 31 is adapted to be braked by being nipped between a pair of disc pads 33 as illustrated in FIG. 3. The disc pads 33 are adapted, as widely known, to be actuated with a pair of calipers (only a piston 34a and a cylinder body 34b of the calipers 34 are illustrated in the diagram).

Inside the knuckle 6 and the hub 8 which rotatably support the wheel disc 5, relatively large communicating paths 36 are formed as illustrated in FIGS. 2 and 3. These communicating paths 36 are available for insertion of the power line 27 for supply of electricity to the motor $M_1$ and for passage of cooling air to the motor. Since the large communication paths 36 are formed along the axis, the distribution of the power line 27 can be facilitated in a great measure. Since the communicating paths 36 are capable of not only permitting insertion of the power line 27 but also generating flow of air, they are able to cool the motor $M_1$ simply by causing the outer ends thereof left to be open.

In the present embodiment, the communicating paths 36 are provided with air cooling means K for introducing the ambient air into the communicating paths 36 for the purpose of further enhancing the cooling effect of the spontaneous flow of air.

The air cooling means K is provided, as illustrated in FIG. 2, with a cooling fan 60 disposed inside the communicating paths 36 and a current regulating cover 61 attached to the outer terminal opening of the communicating paths 36.

The cooling fan 60 is an axial flow fan device adapted to be rotated by a small motor $M_2$ so as to introduce the ambient air into the communicating paths 36.

The cooling fan 60 is not required to be kept in operation while the vehicle is in motion. The desired cooling may be effected by means of the current regulating cover 61 only. The current regulating cover 61 is disposed so as to cover the central part of the motor wheel 3 substantially throughout the entire length thereof as illustrated in FIGS. 2 and 3. It is provided approximately in the central part thereof with an air inlet 62 and an air outlet 63, so as to admit the cooling air through the air inlet 62 as indicated by the arrow in the diagram, lead it into the communicating paths 36, and allow it to cool the motor $M_1$.

Optionally, the current regulating cover 61 may be directly attached to the cover 15 as with screws (not shown). Otherwise, it maybe fitted fast to the terminal parts of the communicating paths 36.

The air outlet 63 may be provided with a current regulating fin 65 adapted to smoothen the flow of the air.

The current regulating cover 61 is preferably to attached directly to the motor wheel 3. This direct attachment obviates the necessity of forming a dead space used for preventing collision between the motor wheel 3 and the current regulating cover 61 when the motor wheel 3 is steered by rotating a steering wheel 48. It also precludes the use of a complicated link mechanism which would be required when the current regulating cover 61 was independently actuated.

Figure 5:
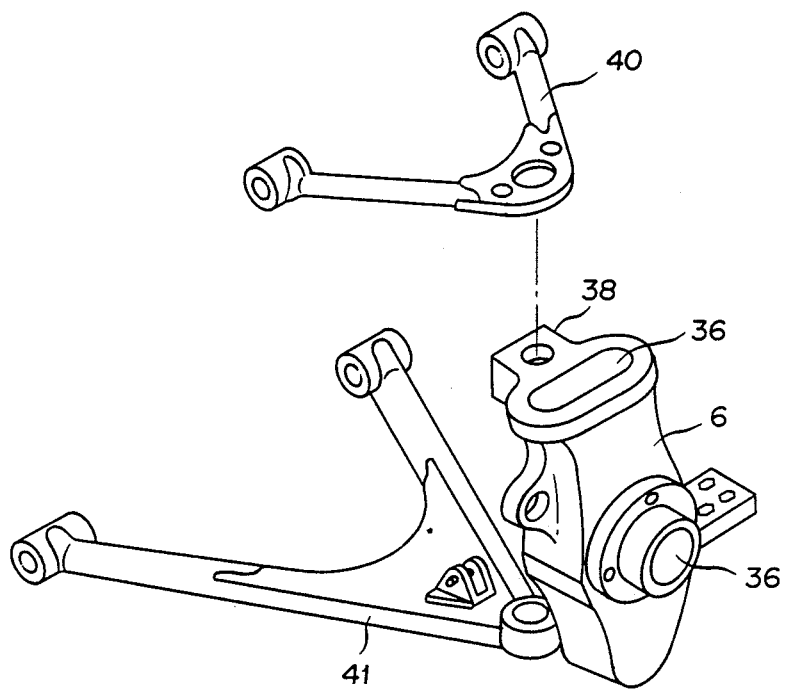
FIG. 5 is an exploded perspective view of suspension for the embodiment.
Figure 6:
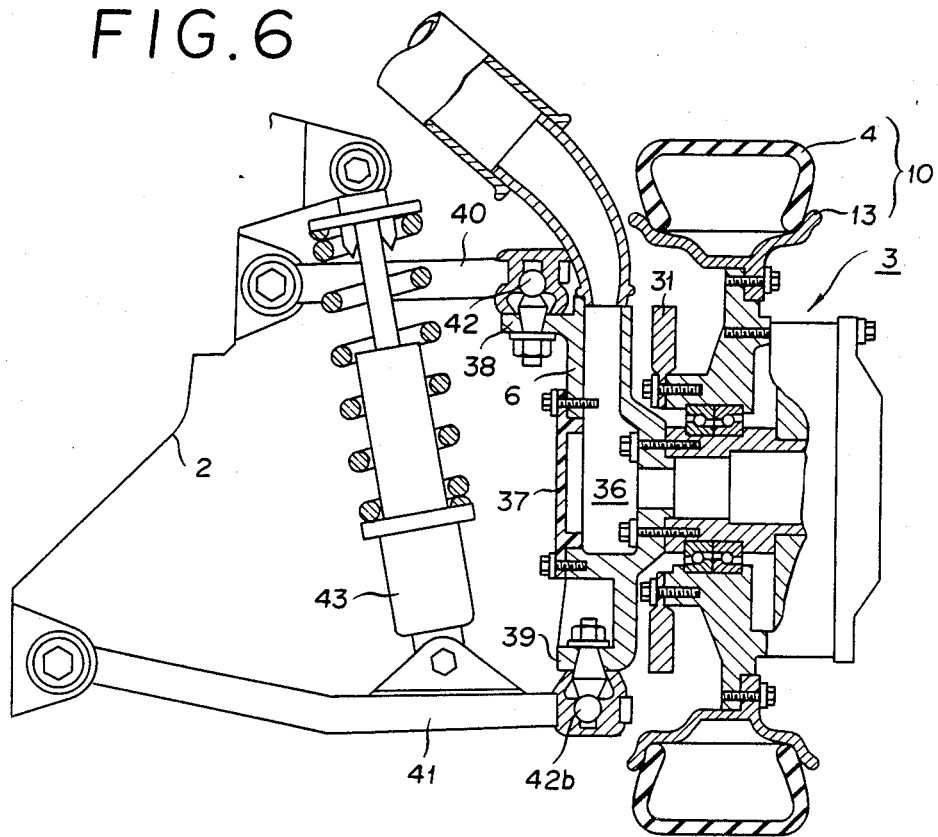
FIG. 6 is a cross-section of the suspension.

Brackets 38 and 39 project from the top and bottom of the knuckle 6 as illustrated in FIGS. 5 and 6. To the brackets 38 and 39, an upper arm 40 and a lower arm 41 are swingably attached respectively through the medium of ball bearings 42a and 42b. The remaining ends of the upper arm 40 and the lower arm 41 are rotatably attached to the vehicle body 2. A shock adsorber 43 is interposed between the lower arm 41 and the vehicle body 2.

Figure 7:
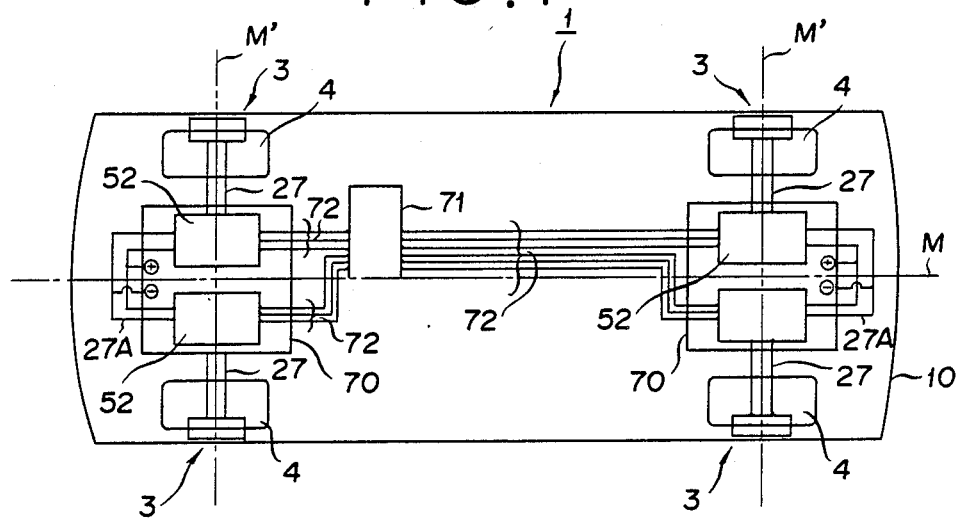
FIG. 7 is a schematic of the electric system in the embodiment.
Figure 8:
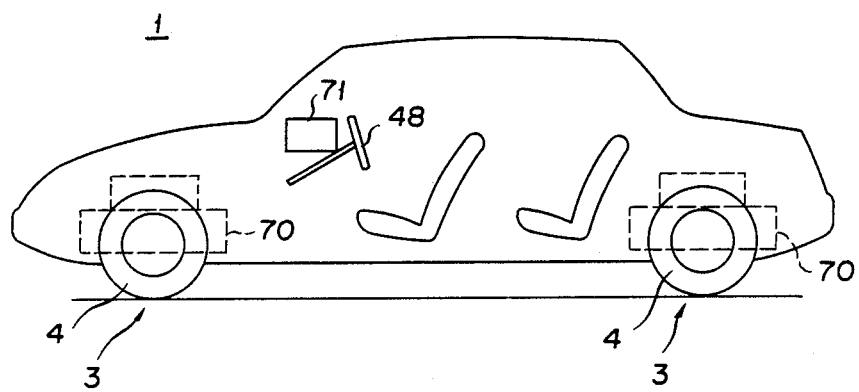
FIG. 8 is a side view schematic of the embodiment.
Figure 9:
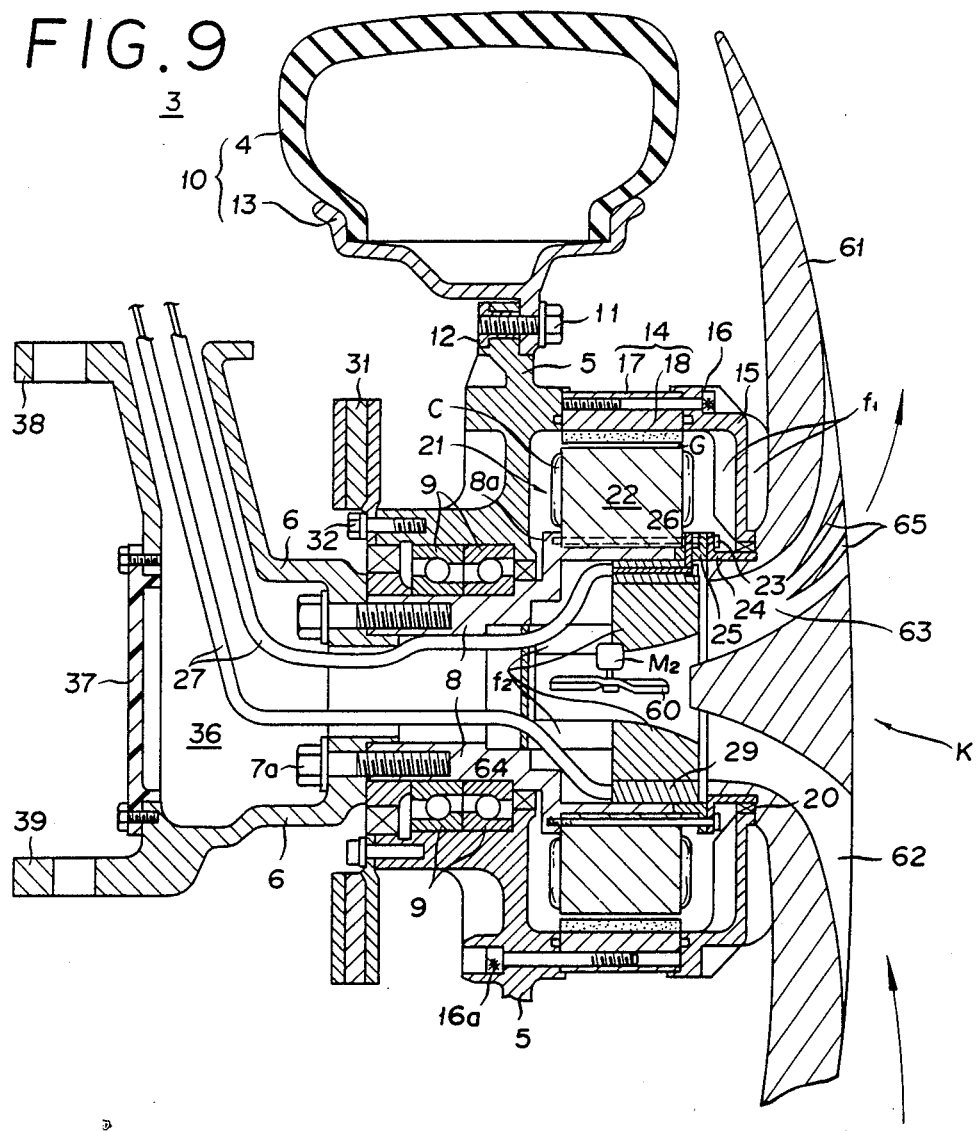
FIG. 9 is a cross-section of another embodiment of the present invention.
Figure 10:
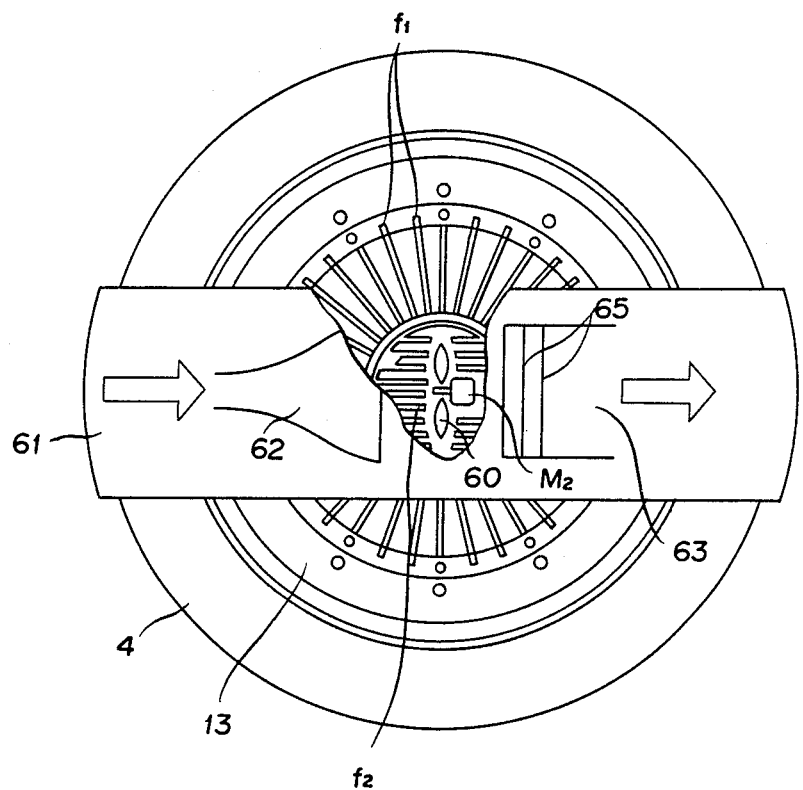
FIG. 10 is a partially cutaway side view of FIG. 9.

FIG. 7 and FIG. 8 are a schematic plan view and a schematic side view of the electric vehicle described above. As illustrated in these diagrams, the motor wheels 3 of this electric vehicle 1 are of the direct-drive and outer-rotor type. Since this electric vehicle has no use for various accessory devices including a reduction gear, the vehicle body 2 is automatically furnished with a fairly large empty space.

Batteries 70 for supply of electricity to the motor wheels 3 are symmetrically disposed within this empty space in the front and rear parts of the vehicle body 2 along the central axial line M. Owing to the empty space, the batteries can be mounted symmetrically relative to the center lines M' of the front and rear axles of the vehicle body 2. Thus, the batteries exert an equal load upon each of the individual motor wheels 3.

Control devices 52 for control of rotational speed of the motor wheels 3 are disposed at positions near the motor wheels 3 above the batteries 70 so that the distances for distribution of power lines 27A between the electrodes (+terminal and −terminal) of the batteries 70 and the control devices 52 and those for distribution of power lines 27 between the control devices 52 to the motor wheels 3 will be minimized. The control devices 52 are disposed at positions selected for equal destribution of their load upon the motor wheels 3 similarly to the batteries 70.

To these control devices 52 is connected a control signal inlet device 71 which is adapted to receive various control signals pertaining to the operation of the electric vehicle 1 such as, for example, control signals indicating the steering angle of the steering wheel 48, the amount of depression of the accelerator pedal or brake pedal, the traveling torque, the amount of charging of the batteries, and the amount of heat generated by the motor wheels.

When the batteries 70 and the control devices 52 are mounted at the selected positions as described above so as to minimize the distances necessary for distribution of the power lines 27 between the control devices 52 and the motor wheels 3 and those for distribution of the power lines 27A between the batteries 70 and the control devices 52, concrete numerical values of reductions obtained in the distances and the weights are as follows.

The comparison is made with reference to the power lines used in the conventional electric vehicle having batteries mounted in the rear part of the vehicle body 2 and the control devices 52 near the operator's seat.

Where an electric wire of 170 g/m is used for the power lines 27 and 27A, the distance (m) of the electric wire saved in the electric vehicle of this invention is computed as follows:

2 (number of motors for the front wheels)×3 number of phases of the same motors)×2.5 (total distance saved between the batteries and the motors)=15 (m)

The weight (g) of necessary electric wire saved is computed as follows:

$$15 \times 170 = 2550 \text{ (g)}$$

When the control devices 52 are separately disposed as described above, control lines 72 are required to be laid out to interconnect the control signal inlet device 71 and the individual control devices 52. Since a very thin electric wire can be used for the control lines 72, the total weight of the control lines 72 is extremely small as compared with that of the power lines 27, 27A. Thus, the addition made by the control lines to the total weight of electric lines is very small. The total weight of the control lines 72, therefore, may well be regarded as virtually equal to that in the conventional electric vehicle.

It is widely held that the batteries constitute the largest factor governing the performance of the electric vehicle 1. Any deficiency in the quality of the batteries can be compensated by making numerous minor improvements such as deliberately studying the shape of vehicle thereby reducing the coefficient of drag $C_d$, decreasing the weight of a vehicle, and lowering the power loss along the power lines from the batteries to the motors, for example.

The technical idea of this invention which consists in decreasing the weight of power cab lines distributed for the power system by shortening the length of electric wire required and decreasing the power loss in the power system by similarly shortening the length of electric wire required, therefore, amounts to an effective measure for compensating the deficiency in the quality of batteries for the electric vehicle.

Now, the operation of this invention will be described below.

The assembly of the motor wheel 3 is started by attaching the hub 8, the brake disc 31, and the wheel disc 5 to the knuckle 6. Then, the power lines 27 are connected to the coil C of the stator 21 after the stator 21 is fastened to the hub 8 from outside by tightening the bolts 23. Finally, the rotor 14 is attached to the wheel disc 5 from outside by means of the bolts 16. In this case, the cover 15 is secured in position at the same time.

When the work of assembling the motor wheel 3 is carried out as described above, the hub 8, the brake disc 31, the wheel disc 5, the stator 21, the rotor 14, etc. are only required to be attached by being sequentially superposed one on top of another. Thus, the assembly is accomplished by an efficient and simple procedure. It naturally follows that the work of maintenance and inspection resorting to disassembly can be fulfilled efficiently.

When a starter switch (not shown) is turned on, a fixed electric current flows from the batteries 71 via the control devices 52 to the power lines 27 and is then forwarded through the power lines 27 past the connectors, stud bolts 30, and the terminals 26 to the coil C.

The rotor 14 is set rotating when the electric current flows across the magnetic field formed by the rare earth metal magnet 18 on the rotor side 14. This rotation of the rotor 14 is transmitted via the bolts 16 to the wheel disc 5 and sets the wheels 10 rotating.

Since the motor wheels 3 are adapted to constitute the direct-drive system in which the rotors 14 are directly rotated by the stators 21, they can be operated as desired without requiring such power transmission devices as a reduction gear, a differential gear and a drive shaft. The parts of the axles of the electric vehicle, therefore, are simple in construction. The obviation of the power transmission devices also contributes to decreasing the entire vehicle weight and volume, increasing the electric vehicle's range and enhancing the ease with which the motor wheels 3 are assembled and given necessary maintenance and inspection.

When the vehicle starts traveling, the ram pressure increases under the current regulating cover 61 and enters the communicating paths 36. As a result, the cooling of the motor wheels 3 can be effected more efficienty. To be more specific, while the vehicle is traveling, the ram pressure collides against the outer heat radiating fins $f_1$ to permit external cooling of the motors $M_1$ themselves. Further, the ram pressure enables the cooling air to flow through the air inlets 62 bored in the current regulating covers 61 and advance smoothly into the communicating paths 36. Owing to this current of cooling air, the motors $M_1$ are fully cooled even to their cores.

The heat emanating from the motors, etc. is quickly removed, by the air which flows through the communicating paths 36 formed inside the knuckles 6 and the hubs 8.

Particularly, since the current regulating covers 61 extend in the direction of the vehicle's travel and cover the outer sides of the motor wheels 3, they serve an additional purpose of alleviating the air resistance offered by the motor wheels 3.

While the vehicle is parking after travelling some distances, the motor $M_1$ and the power lines 27 heated by Joulean heat are cooled by removing heat with air introduced into the communicating paths 36 by the rotation of the cooling fans 60 or indirectly through the medium of the heat radiating fins $f_1$.

The present embodiment has been described as causing the cooling air to flow inside the communicating paths 36. Where the cooling of the motors $M_1$ forms the sole matter for consideration, the advance of the cooling air along the communicating paths 36 is not always necessary. Optionally in this case, the knuckles 8 may be provided in the interior thereof with a partitioning wall 64 adapted to close the communicating paths 36, so that the cooling air flowing in through the air inlets 62 will be allowed to flow toward the air outlets 63 instead of being passed throughout the entire communicating paths 36. In this arangement, the flow of the cooling air in the direction of the vehicle's travel will be smoothened and the resistance offered by the air to the vehicle's travel will be alleviated.

In this case, inner heat radiating fins $f_2$ of aluminum may project inwardly inside the communicating paths 36, so that these inner heat radiating fins $f_2$ will enhance the efficiency of cooling of the motors $M_1$. Optionally, these inner heat radiating fins $f_2$ may be partially utilized for supporting the small motors $M_2$ inside the communicating paths 36.

The present invention may be embodied in the form of a multi-axle type electric vehicle as illustrated in FIG. 11. Specifically illustrated in the diagram is a three-axle type electric vehicle (truck or bus, for example).

As illustrated in the diagram, batteries 70 for supply of electric current to the motor wheels 3 are disposed, similarly to those in the preceding embodiment, symmetrically relative to the central axial line M in the longitudinal direction of the vehicle body 2 so that their weight will be evenly distributed. Individually, they are disposed symmetrically relative to the center lines M' of the relevant axles of the vehicle body 2, so that the batteries 70 will exert an equal load upon the motor shafts 3.

The control devices 52 for control of the rotational torque of the motor wheels 3, etc. are disposed at positions above the batteries similarly to those in the preceding embodiment, so that the distances of distribution of the power lines 27A between the electrodes (+terminals and −terminals) of the batteries 70 and the control devices 52 and those of the power line 27 between the control devices 52 and the motor wheels 3 will be minimized. The control devices are mounted at positions selected for uniform distribution of the load exerted upon the motor wheels 3 similarly to the batteries.

To the control devices 52 is connected the control signal input device 71 adapted to set signals indicating various operations. Also in this case, when the batteries 70 and the control devices 52 are mounted at such positions as described above, the total distance of distribution of the power lines 27 between the control devices 52 and motor wheels 3 and that of the power lines 27A between the batteries 70 and the control devices 52 are both minimized. As regards the distribution of weight of the vehicle, since the batteries 70 and the control devices 52 which have a large mass are positioned on the center lines M' of the axles, their total weight is stably distributed.

Since this invention contemplates designing the motor wheels so as to impart to the electric vehicle the functions of the direct-drive and outer-rotor systems, the electric vehicle has no use for such power transmission devices as a reduction gear, a differential gear, and a drive shaft as described above. Thus, the present invention realizes a simplification in construction of the parts of axles and a reduction in weight and volume of the vehicle on the increase in range, and enhances the ease with which the motor wheels are assembled and given necessary maintenance and inspection.

The communicating paths are formed inside the knuckles and hubs to permit flow therethrough of cooling air intended to remove heat from the motors. The heat emitted by the power lines inserted through the communicating paths and by the motors themselves, therefore, can be quickly removed. Moreover, the distribution of power lines is facilitated owing to the communicating paths. The current regulating covers are elongated in the direction of the vehicle's travel and consequently cover the outer sides of the motor wheels. Thus, these covers serve the purpose of reducing the air resistance offered by the motor wheels during the vehicle's travel and obviate the necessity of providing a dead space exclusively for use by the covers themselves. The air inlets formed in the current regulating covers serve the purpose of smoothening the introduction of cooling air.

Further, the present invention improves the distribution of the vehicle weight and decreases the power loss along the power lines and reduces the total weight of the power lines because the batteries for supply of electricity to the motor wheels and the control devices for control of the motor wheels are disposed in proximity the motor wheels so as to minimize the distances of distribution to power lines for connecting of the control devices and the motor wheels. As a result, the range of the electric vehicle can be enhanced further.

What is claimed is:

1. An outer-rotor type motor wheel, comprising: a knuckle, a hub coaxially interlocked with said knuckle, a wheel disc rotatably attached to the periphery of said hub, a wheel secured to the periphery of said wheel disc, a rotor fastened to an outer side of said wheel disc from the direction of said outer side, and a stator coaxial to and spaced from said rotor by a small gap and fastened to said hub from said direction of said outer side.

2. A wheel as in claim 1, further comprising motor cooling means including a communication path defined by empty spaces within said knuckle and said hub and having an outer opening, and a current regulating cover attached to said outer opening and including an air inlet in communication with said communicating path.

3. A wheel as in claim 2, wherein said motor cooling means further includes a motor cooling fan disposed inside said communicating path.

4. A wheel as in claim 1, wherein at least one battery for supply of electricity and control means for control of said motor wheel are disposed in proximity to said motor wheel, and said at least one battery, said control means and said motor wheel are interconnected with power lines.

5. An electric vehicle in combination with a plurality of wheels as in claim 4, wherein said at least one battery and said control means are severally disposed symmetrically relative to the central axial line in the longitudinal direction of said electric vehicle.

* * * * *